July 6, 1937.  P. L. FAUTH ET AL  2,086,072
PROCESS FOR DEHYDRATING AND RENDERING FLESH
Filed April 21, 1934
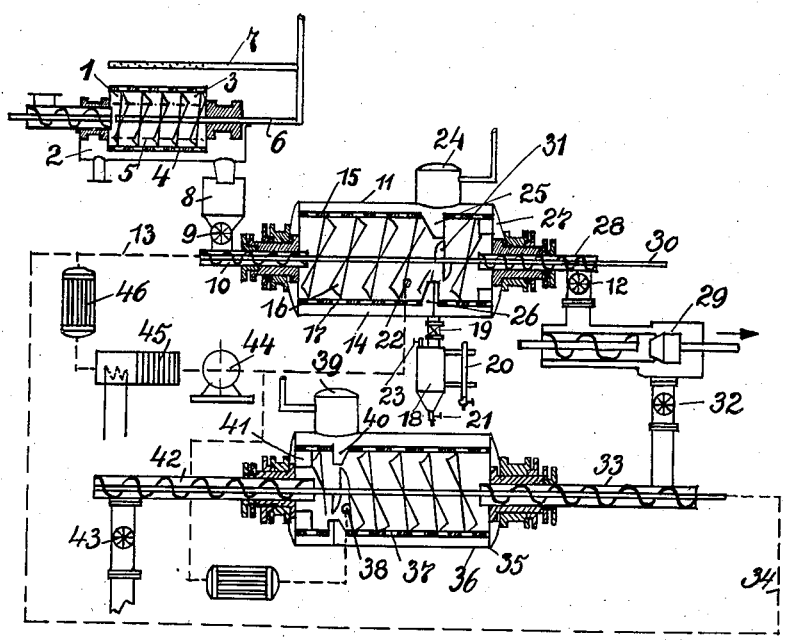

Patented July 6, 1937

2,086,072

UNITED STATES PATENT OFFICE 2,086,072

PROCESS FOR DEHYDRATING AND RENDERING FLESH

Philipp Lorenz Fauth, Wiesbaden-Dotzheim, and Joseph Reichert, Wiesbaden, Germany, assignors to Gesellschaft zur Verwertung Fauth'scher Patente m. b. H., Wiesbaden, Germany Application April 21, 1934, Serial No. 721,808
In Germany May 8, 1933

8 Claims. (Cl. 87—13)

In dehydrating and rendering substances which contain water or water and oil use has heretofore been made of processes according to which the water contained in the substances was eliminated by evaporation only. When substances with a very high water content are involved, the necessary apparatus and process are very complicated and expensive. This is particularly the case, for example, in the treatment of whales. Inasmuch as whale flesh contains a great deal of water, the preparation thereof by drying on the floating boiler ships is attended with very great costs. Heretofore these floating boiler plants have for the most part treated only the blubber for obtaining the oil therefrom. Only recently, for industrial and biological reasons, has the flesh and bones of the whale been treated by drying for the production of fodder, the whale being completely utilized and species protected from extermination. The processes heretofore employed were based on the above principle exclusively of evaporating the water contained in the whale flesh, etc. The apparatus used for this process consisted as a rule of horizontal or upright receptacles in which the whale meat, etc., was treated by direct or indirect steam under pressure in vacuo, and the disintegrated material then dried by means of hot air or subjected to a pressing to separate out the oil or fat required for the boiling.

Attempts have also already been made to mix the whale parts in a comminuted condition with oil, and to boil the mixture under a vacuum. In this case, it is true, a dry material of somewhat better quality has been obtained but the expensive apparatus required for the boiling process, whereby the total costs are out of proportion to the output, constitute a disadvantage of the process. Moreover, the steam consumption is extraordinarily great and the quality of the resulting product is very unfavourably influenced by the scorching of the flesh on the heated surfaces of the apparatus. The boilers used for carrying out this process are, as a rule, provided with circulating pumps and/or stirrers and with steam jackets and/or heating tubes. The comminuted whale parts mixed with whale oil are maintained in circulation during the operation of the process with the aid of pumps or stirrers, with a view to preventing the flesh from scorching on the heated surfaces. The water vaporized by the heat is sucked off with the aid of a vacuum. Experience has shown, however, that notwithstanding the process of circulating the material with the aid of pumps and stirring, the material can never be prevented from scorching at the heating surfaces.

As mentioned above, however, this results in a lowering of the quality of the oil and flesh, apart from the fact that heat transference is prevented. The aforesaid processes do not operate continuously.

The object of the present invention is a process and an apparatus, serving to carry the same into effect, in the utilization of which the hereinbefore described disadvantages are avoided. An essential characteristic of the process of this invention is to be found in the fact that the process of dehydrating the material may, if desired, be carried out continuously and with a lower consumption of steam.

The invention is based on the discovery that a part of the water contained in the material can be set free and removed as such, i. e. not in the form of vapor, by suitably preparing the material and suddenly subjecting the material to a temperature difference between the material and the heating agent. The action of the hot agent on the cold flesh coming from the washing drum produces a contraction of the cells, but the heating at the interior also produces a pressure on the cells, whereby the water passes out therefrom. This part of the spontaneously liberated water, therefore, need not be removed from the material by evaporation. The aforesaid process can be carried out within various temperature ranges, but is preferably effected at a temperature approximating to the boiling point of the water. In this case, for example when working up whale flesh, about 30% of the water contained in the material is liberated as such.

According to this invention it has been further found that, under the above described conditions, not only does a portion of the water flow off free, but the greater portion of the water still present in the material can be expressed at this stage by an immediately following pressing process. The small residues of water still present can then be vaporized in a suitable and known manner.

The present invention is not limited to the dehydration of whale material but is also applicable to the treatment of other water-containing or water- and oil-containing products, such as other animal constituents, fish and fish waste.

The following essential characteristics and particular advantages of the process of this invention are to be emphasized:

1. The dehydration process can be effected continuously.

2. The material throughout the entire operation does not come into contact with heated surfaces, so that scorching is impossible.

3. By suitable pretreatment and with the aid of suitable apparatus about 30% of the water contained, for example in whale flesh, is spontaneously liberated.

4. By introducing a pressing process at a suitable stage of the process, a further relatively large quantity of the water is expressed, so that only small residual quantities need be vaporized, and 5. The process lasts only a few minutes at a relatively low temperature. This results in a lower consumption of steam for ship and land operations, an economy in fresh water, (e. g. in whale-boiling stations) and a high quality of the resulting products is obtained.

The accompanying drawing illustrates, by way of example an embodiment of apparatus according to this invention.

Referring to the drawing, 1 is a washing drum, 2 is a trough, 3 is a revolving screen, rotating in said trough and provided internally with helical conveyors 4 and blades 5, 6 is a conduit for the introduction of water into said revolving screen 3, and 7 is a water sprinkler. 8 is a feed hopper, 9, 12, 32 and 43 are valves, enabling various parts of the apparatus to be closed, 10 28, 33 and 42 are conveyor screws for conveying the material under treatment. 11 is a pretreating apparatus, comprising a stationary cylindrical outer drum 14, an inner rotating drum 15, provided internally with helical conveyors 16, and a perforated sheet metal casing 17. The pretreating apparatus 11 can be evacuated, the vacuum zone being bounded by the valves 9 and 12. 18 is a water separator connected with the said outer drum 14 and consisting of a cylindrical vessel capable of being disconnected from the drum 14 by the valve 19 and provided with a water level indicator 20 and an outlet 21. 13 is a conduit for the heat-transferring agent. 29 is a press for expressing the material issuing from the apparatus 11 through the sluice 12. 35 is a vaporizer comprising an outer stationary drum 36 and an inner revolving screen 37.

In carrying the invention into effect, using the apparatus illustrated in the drawing, the whale flesh, for example after having been mechanically comminuted in the usual manner, enters the washing drum 1, where it is purified from blood by washing with water. The flesh contained in the revolving screen 3 is continuously moved forwards by the action of the helical conveyors 4 and blades 5 and is repeatedly forced by the latter to partake in a rotary movement. Water is directly sprayed onto the flesh through the conduit 6 whilst the sprinkler 7 continuously rinses the revolving screen 3. The conduit 6 and the sprinkler 7 only deliver water along about two-thirds of the length of the washing drum, in such a way that washing is effected only along this stretch, whilst in the last third of the revolving screen as much of the water as possible is drained off. The washed flesh falls out of the washing drum through the open rear end of the revolving screen 3 into the feed hopper 8, from which it is conveyed through the sluice 9 to the conveyor screw 10. The conveyor screw 10 passes the flesh into the pretreating apparatus 11.

The heat-transferring agent enters through the conduit 13. The heat-transferring agent and flesh are mixed together in such proportions that the temperature of the mixture entering the apparatus almost reaches the boiling point of the water, corresponding to the pressure prevailing in the apparatus.

The operation in the pretreatment apparatus is as follows:—

The flesh is continuously introduced into the rotating drum 15 by the conveyor screw 10 and, a heat supplying substance, for example, hot oil is introduced therein through the conduit 13. The oil being under the pressure produced by pump 44 also tends to carry the flesh into the drum 15. The stationary drum 14 is filled with hot oil to such a height, that the flesh contained in the rotating drum 15 is continuously washed in hot oil. The oil discharge takes place through the discharge opening 22. At the commencement of the operation the water separator 18, disposed at the lowest point of the drum 14, first becomes filled with oil. The water, liberated during the operation, being heavier than the oil, enters the water separator 18, from which it gradually displaces the oil. As soon as the water level indicator 20 shows that the container 18 is filled with water, the valve 19 is closed, after which the water is allowed to discharge through the discharge opening 21 by opening the de-aerating cock 23. The water flowing off at this point may be further conveyed to a separating plant not shown in the drawing, for the purpose of separating any traces of oil still contained therein. After discharge of the water the valve 19 is again opened.

An outlet 24, which is connected with a vacuum condensation plant, not shown in the drawing, is situated at the highest point of the stationary drum 14.

Only three-quarters of the length of the rotating drum 15 serves as a mixing drum, i. e. the flesh is continuously washed in hot oil only along this stretch of the drum, whilst the rest of the drum serves for dripping or draining. For this purpose a constriction 25, with which a separating partition 26 engages, is provided in the rotating drum 15. At the end of the drum 15, i. e. at the draining end, there are disposed discharging blades 27, which convey the drained flesh to the conveyor screw 28, which in turn conveys the flesh through the valves 12 to the press 29. Helical conveyors 31, which convey the flesh into the draining portion of the rotating drum 15, are disposed on the shaft 30 at the constricted portion 25 of the drum.

The flesh is subjected to expression in the press 29, for the purpose of removing further relatively large quantities of the separated water.

The material from which the water and oil have been expressed is conveyed from the press 29 through the sluice 32 to the conveyor screw 33, where it is mixed with hot oil coming from the conduit 34 and introduced into the vaporizer 35. The oil outlet 38 is disposed at such a height in the revolving screen 37 that the flesh contained therein is continuously washed in hot oil. The object of this washing drum is to effect removal of the water to the desired degree. The water vapors are sucked through the outlet 39 by a vacuum condensation plant (not shown). The revolving screen 37 is provided at one end with a constriction 40 and with discharging blades 41, which convey the dehydrated flesh, from which the oil has drained off, to the conveyor screw 42, which in turn conveys the material to the sluice 43. The vacuum zone of the boiling apparatus is accordingly bounded by the sluices 32 and 43.

The dehydrated flesh is then with advantage cooled.

The oil discharging from the boiling apparatus at 22 and 38 is conveyed with the aid of a pump 44 to the continuously operating oil filter 45 and the heat exchange apparatus 46. The oil is here brought with the aid of steam to the desired temperature, after which it passes through the conduits 13 and 34 into the rotating drums 15 and 37 respectively.

The invention is not limited to the employment of the above described apparatus, which must be adapted to the material under treatment.

It has been further surprisingly found that, instead of using oil as heat-transferring agent, water can be still more successfully employed. It is also possible with the aid of hot water to separate a considerable percentage of the water contained in the flesh without evaporation. If the water obtained in this way is concentrated by evaporation, a meat extract of admirable qualities is obtained.

It follows therefrom that the above described modification offers considerable economic advantages. These advantages reside in the fact that the apparatus, in which the flesh is pretreated with a view to removing a portion of the water contained therein, need not be under vacuum. Hot oil must not, as is known, come into contact with air, because otherwise it would become oxidized and subsequently darken. For this reason a vacuum must be employed when using oil, but is, of course, not necessary when using water. The economic advantages resulting therefrom are obvious.

In addition to the foregoing, a considerably greater quantity of heat can be transferred with water than with the same quantity of oil, so that the heat-exchange apparatus can be constructed correspondingly smaller and therefore more cheaply. In certain circumstances the heat exchange apparatus can be entirely omitted in the pretreatment apparatus, if the latter is provided with a heating jacket. The further advantage, however, follows therefrom that circulation of the heat-transferring liquid by pumping can be omitted.

The following further possibility when carrying out the first named process has been found. According to this process oil is likewise employed as heat-transferring agent for the purpose of vaporizing the residual water from the flesh, crude whale oil being, for example, used for vaporizing the residual water in whale flesh.

It has now been found that the blubber taste and smell of the whale flesh, which is not present in the fresh condition of the flesh, will also not appear subsequently, if, in place of crude whale oil, a refined and hardened edible whale oil or another suitable animal or vegetable edible oil or fat is employed as heat-transferring agent in the vaporizer. It has been found that in this case the whale flesh obtained has no taste and smell of blubber.

If the flesh treated in this way is cooled down after drying, it will become coated with a thin layer of the oil or fat used in drying. This layer has a preserving effect, so that flesh obtained in the described manner is a very valuable product for human nutrition. It can be kept without deteriorating for any desired length of time.

In the first named process oil is employed for effecting the transference of heat, in order to remove the residual water from the water-containing or water- and oil-containing material, the residual portion of the water, for example in the flesh and the like, being vaporized under vacuum in the hot oil.

It has now been found that superheated vapors, for example superheated steam, can also be advantageously employed for the heat-transference or for evaporating the residual water. The highly superheated steam entering the flesh or the like under vacuum gives up the greater portion of its heat to the flesh, whereby the water contained in the flesh is caused to vaporize. The superheated vapors, which do not give up their heat, pass more or less into the condition of a saturated vapor by becoming mixed with the water vapors from the flesh.

It has been further found that considerable economy in steam is obtained, if a vacuum compressor is employed for sucking off these resulting saturated vapors in such a manner that it compresses the sucked off vapors, a portion of the compressed vapors being passed through the superheater and being again employed for dehydrating flesh under a vacuum. The other non-superheated portion is employed as compressed saturated vapor for any desired superheating purpose. Owing to the fact that the water contained in the flesh is continuously vaporized, the amount by weight of steam sucked out by the vacuum compressor is greater than the quantity of superheated steam that has been blown into the water vaporizing chamber, whereby an excess of steam results.

It has been further found that oil and superheated steam may also be employed together by allowing superheated steam to flow into the oil standing under vacuum, the superheated steam raising the oil to the temperatures required for dehydrating the flesh or the like. Dehydration of the flesh, and, in the case of fat-containing material, also simultaneous melting of the fat, take place in the hot oil bath.

The directly superheated steam flowing through the oil or fat may, moreover, be so conveyed with regard to its quantity and temperature that it simultaneously deodorizes the fat issuing from the fat-containing constituents.

Thus, it has been found that, in the treatment of water-containing or water- and oil-containing products according to the above described processes, which products contain a large quantity of oil and fat, a very intensive removal of the fat is simultaneously effected by the dehydration. If the dehydration of such substances, containing water and large quantities of fat, for example whale blubber, bacon, pork or other flesh, containing large quantities of fat, or the like, is effected according to the combined process, in which oil and superheated steam are employed together, deodorization of the fat obtained is simultaneously effected by the treatment with the superheated steam.

It has been finally found that the action of the steam, both in the dehydration of flesh or other water- and fat-containing substances and also in the removal of fat or bitter tasting substances therefrom, is much more intensive, if the superheated steam is first passed for a short time, for example one minute, into the material under an excess pressure of about 2–5 atmospheres and the material is thereafter introduced together with the superheated steam into the vacuum zone. Owing to the sudden considerable fall of pressure resulting therefrom, the evaporation, dehydration and removal of fat or bitter tasting substances are much more intensive, because the cell walls are ruptured owing to the sudden evaporation of the water.

What we claim is:

1. Process for dehydrating material composed of animal cells containing water or water and oil, such as, whale meat, blubber and bones, comprising, comminuting the material, quickly raising the temperature of the material by immersing it in non-hygroscopic liquid bath at a temperature near but not above the boiling point of water whereby the cells contract while the water or water and oil contained therein expands and the cells burst and the water or water and oil contained therein is released therefrom, drawing off released water, or water and oil, removing the solid material from the bath, pressing the material to remove a further quantity of water, and finally evaporating the remaining water from the material by raising it to a temperature above the boiling point of water.

2. Process for dehydrating material composed of animal cells containing water or water and oil, such as, whale meat, blubber and bones, comprising, comminuting the material, quickly raising the temperature of the material by immersing it in oil at a temperature near but not above the boiling point of water whereby the cells contract while the water or water and oil contained therein expands and the cells burst and the water or water and oil contained therein is released therefrom, drawing off released water or water and oil, pressing the material to remove a further quantity of water, and finally evaporating the remaining water from the material by raising it to a temperature above the boiling point of water.

3. A process as claimed in claim 1, and maintaining the material under treatment out of contact with hot solid surfaces during the dehydration thereof.

4. Process for dehydrating material composed of animal cells containing water or water and oil, such as, whale meat, blubber and bones, comprising, comminuting the material, quickly raising the temperature of the material by immersing it in non-hygroscopic liquid bath at a temperature near but not above the boiling point of water whereby the cells contract while the water or water and oil contained therein expands and the cells burst and the water or water and oil contained therein is released therefrom, drawing off released water or water and oil, pressing the material to remove a further quantity of water, and finally evaporating the remaining water from the material by raising it to a temperature above the boiling point of water by directly contacting the material with hot oil.

5. A process as claimed in claim 1, in which the raising of the temperature of the material after the pressing to above the boiling point of water for removing said remaining water is performed by directly contacting the material with superheated steam, the vapor given off by said material being commingled with the steam, and removing said steam and vapor from contact with the material.

6. A process as claimed in claim 1, in which the step of raising of the temperature of the material above the boiling point of water is performed by directly contacting the material with hot edible oil, and the high temperature of said oil is maintained by flowing superheated vapor directly into contact therewith.

7. A process as claimed in claim 1, in which the step of raising the temperature of the material after the pressing to above the boiling point of water for removing the remaining water is performed by directly contacting the material with superheated steam, the vapor given off by said material being commingled with the steam, removing said steam and vapor from contact with the material, compressing the removed steam and vapor, superheating the compressed steam and vapor and then returning it to contact with material to be treated.

8. A process as claimed in claim 1, in which the raising of the temperature of the material after the pressing to above the boiling point of water for removing the remaining water after the pressing operation is performed by directly contacting the material with superheated steam, the vapor given off by said material being commingled with the steam, removing said steam and vapor from contact with the material, the time during which the superheated steam is directly contacted with the material being approximately one minute at a superatmospheric pressure of about 2–5 atmospheres, and then subjecting said material and steam to vacuum.

PHILIPP LORENZ FAUTH.
JOSEPH REICHERT.